Sept. 27, 1966     S. C. RETHORST     3,274,966
WATER SURFING CRAFT

Filed July 6, 1965     3 Sheets-Sheet 1

INVENTOR.
SCOTT C. RETHORST
By
Smyth, Roston & Pavitt
ATTORNEYS.

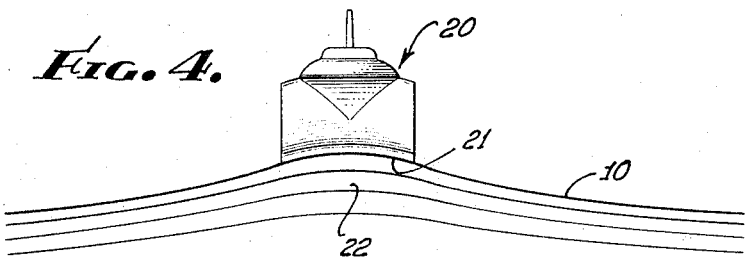
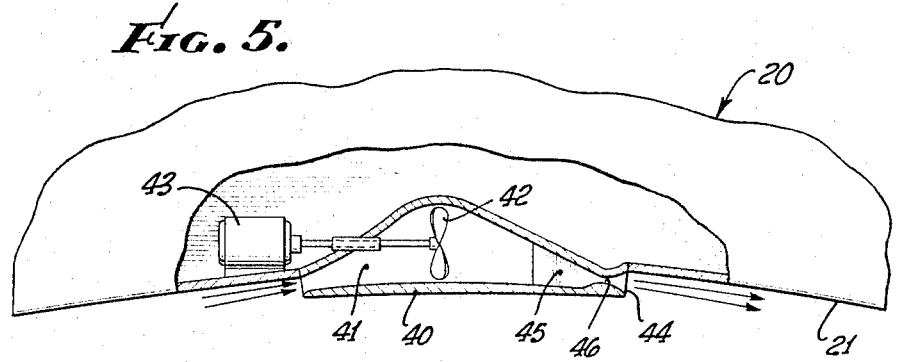
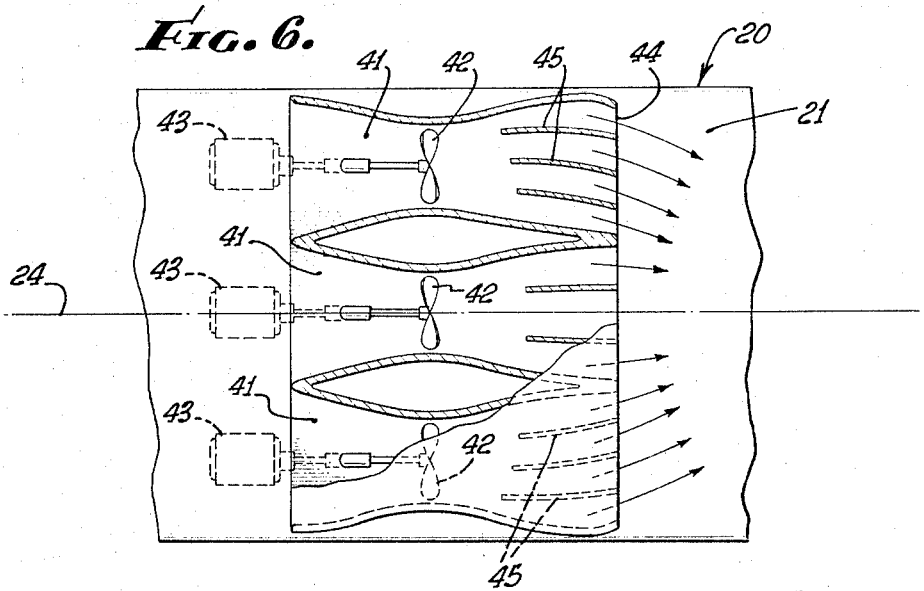

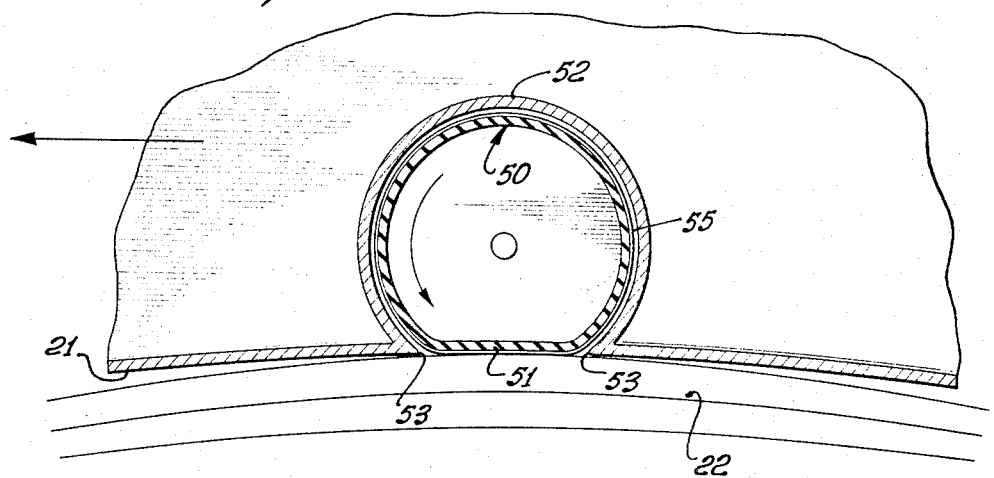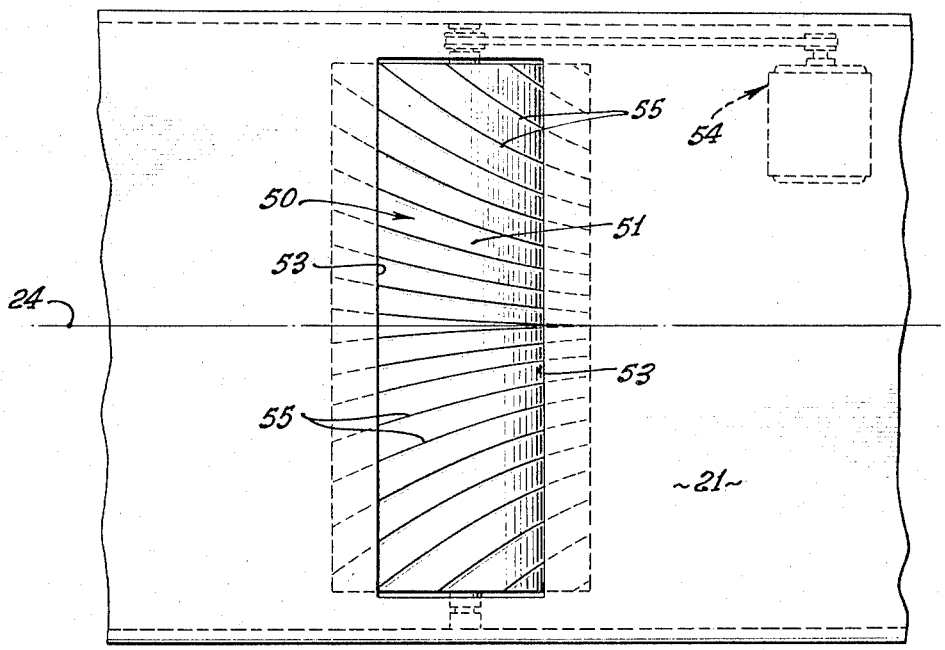

3,274,966
WATER SURFING CRAFT
Scott C. Rethorst, 1661 Lombardy Road,
Pasadena, Calif.
Filed July 6, 1965, Ser. No. 469,426
11 Claims. (Cl. 114—62)

This is a continuation-in-part of application Serial No. 346,916 filed February 24, 1964, by Scott C. Rethorst for Water Surfing Craft and now abandoned.

This invention pertains to improvements in water craft and in particular relates to an improved interface surfing craft which is shaped with camber or a concavity on its underside to develop a standing water wave from the forward motion of the craft, providing dynamic sustaining pressures on which the craft rides in translational motion.

Water craft may be sustained by lifting forces produced directly by water which may be classified as hydrostatic or hydrodynamic, depending on whether the pressures are produced by water at rest or at speed. The classic displacement vessel depends upon hydrostatic pressure for its support, whereas the conventional planing craft depends upon hydrodynamic pressure.

Displacement lift is limited to low speeds because of the surface wave drag involved in ploughing the displacement volume through the water, and because of the excessive frictional drag caused by the large wetted surface area required to bound the volume providing the displacement lift.

Conventional planing is limited to (1) smooth water because of the high loads in bouncing from one wave to another in rough water, and (2) light weight craft because planing lift is a reaction force due to the change in momentum of the water in impacting against the planing surface, which is significant only at appreciable inclination angles where the drag component is also large, resulting in low $L/D$ ratios and excessive power requirements.

The present invention of a water interface surfing craft provides a resolution to the limitations of both displacement craft and planing craft, and is directed towards the objective of high speed operation in rough water by the development of a standing water wave on the ocean surface to provide a form of circulation lift employing potential flow. Such a standing water wave is generated by a cambered bottom, on which the craft rides the crest of this wave like a surfboard, and hence this operation is called surfing.

The surfing mechanism develops a force by imposing a boundary condition in the form of a cambered bottom on a potential flow. The process is not unlike the development of a circulation lift force in a potential flow in an unbounded fluid say as employed by an airfoil, with the important distinction that in an unbounded fluid the Kutta condition imposed by a sharp trailing edge also provides further circulation lift due to angle of attack, which may be regarded as a further camber contribution, variable in effect due to shifting of the forward stagnation point with angle of attack. This angle of attack contribution to circulation lift, because of the discontinuity of the free surface in the absence of an upper flow field, cannot be developed on the water interface.

Thus while circulation lift can be developed in an unbounded fluid by both angle of attack and camber, in a bounded fluid on the water interface the angle of attack contribution is difficult to realize, while the camber contribution is feasible. Again because of the interface, the camber cannot be provided on the upper surface of the craft and transmitted indirectly through the upper pressure field as in the case of air lift, because for water lift on the interface there is no upper pressure field, and hence the camber must be provided directly on the bottom of the craft.

This form of circulation lift in a potential flow produces in surfing large forces because the flow field extends to infinity both fore and aft of the craft and down to the bottom of the ocean. This reaction against an infinite mass of fluid is characteristic of a potential flow in producing a large lift force, as compared to the small lift force produced by a finite stream tube in impacting against a surface as in conventional planing.

The high pressures developed on the underside of the craft in surfing are created by the centrifugal force of the water particles in flowing around the curved path of the standing wave surface induced by the cambered bottom. Because of this curved flow path the pressures on the underside have a forward or thrust component on the forward section, thus providing a leading edge bottom thrust on the under surface analogous to the leading edge suction on the upper surface of airfoil theory in an unbounded fluid, counteracting the drag component on the aft section, and thus producing zero net pressure drag, leaving only frictional drag to be overcome.

Thus the surfing mechanism produces a large lift force and a small drag, leading to large lift to drag $(L/D)$ ratios, thereby providing efficient translation.

As the craft operates at higher speed, the lift force will raise the craft more and more out of the water, thereby contacting the water surface with a decreasing bottom area and reducing frictional drag.

Thus this invention provides a unique form of dynamic water lift developed by a concave bottom craft which has the potential of providing efficient high speed ocean transport in rough water by enabling the craft to ride on the crest of a self induced standing wave, and hence called surfing. The wetted surface area of the concave bottom would decrease in chord with speed, thus providing both (1) reduced skin friction drag and (2) increased aspect ratio of the wetted contact area thereby further reducing induced drag.

The development of a standing water wave will enable the craft to ride on a straight and level path above the rough random waves of the ocean interface itself, thus providing a smooth ride and minimum structural loads on the craft even in going across rough seas.

The higher gravitational head in the standing wave caused by the pressure of the load will result in a spanwise flow, which will tend to lower the height of the wave in the rear, or produce an additional downwash, which when added to the downflow of the wave itself, will tilt the local flow down aft, and the surfing craft will then find itself riding uphill in a locally inclined flow, and the resulting force, which is normal to the local flow, will have an aft component, or induced drag. All this is similar to the induced drag of aeronautics, except here the analogy is confined to the undersurface of the wing only, and the unrecovered energy instead of appearing as a trailing vortex system downstream would appear in a series of surface waves.

This energy loss in surfing can be reduced and possibly eliminated by providing an inboard component to the water aft of the loaded portion of the craft, so as to counteract the outboard component due to the wave height in its spanwise flow. The inboard component may be provided either by grooves, fences, ridges, barriers, etc. on the bottom of the craft inclined inboard to so move the boundary layer, or by the emission of a water jet having an inboard component. In both cases the bottom of the craft would be cambered laterally and faired smoothly into the center of the craft.

Propulsion may be provided by water jets, which would integrate high density water propulsion with uniform spanwise energy distribution, thereby reducing the three dimensional dissipative effects of side wave generation and induced drag. This would involve using the water pump to emit a sheet of high velocity water across the span aft of the contact region, this sheet having an inboard component increasing towards the sides. The water jets would be emitted aft through spanwise nozzles along the aft edge of the cruise water contact region, with these jets having an inboard component so that the curvature of the water jet in flowing aft would help counteract the outboard component due to the wave height. Thus this water pump method would integrate high density water propulsion with a form of edge curtain sealing, thereby aiding in the side containment of the high pressure developed by the circulation flow, enhancing lift and contributing towards the achievement of zero induced drag.

Propulsion could also be provided by a moving surface, which would reverse the role of surface friction in providing thrust rather than drag. The mechanism here would be to provide the cruise bottom water contact area as a powered roller, built as a large rotating cylinder, deformable to accommodate the camber, and powered to provide thrust, and including inboard inclined ridges to minimize three dimensional losses. Such a cylinder would rotate at a speed not only equal to the velocity of the craft to eliminate frictional drag, but at an increase in speed to provide thrust.

Alternatively propulsion may be provided by air propellers mounted on the upper structure of the craft.

This improved water craft would utilize displacement forces both at rest and in slow translation. As its speed increased, the dynamic pressure on the bottom would raise the craft up out of the water, thus providing lift at higher speeds by dynamic forces, initially at transition speeds on a large portion of the bottom area, and at high speeds on a relatively small area.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawing in which:

FIGURE 4 is a rear view of the craft shown in FIGURES 1 and 2;

FIGURE 5 illustrates a broken open, section view of a bottom portion of the craft illustrating an example for propelling the craft;

FIGURE 6 illustrates schematically a bottom view of the bottom portion shown in FIGURE 5 with a coverplate removed;

FIGURE 7 illustrates schematically and as sectional view a different thrust producing means for propelling the craft; and FIGURE 8 illustrates a bottom view of the portion of the craft shown in FIGURE 7, showing a drum portion as it is exposed to the water underneath the craft.

Figure 1:
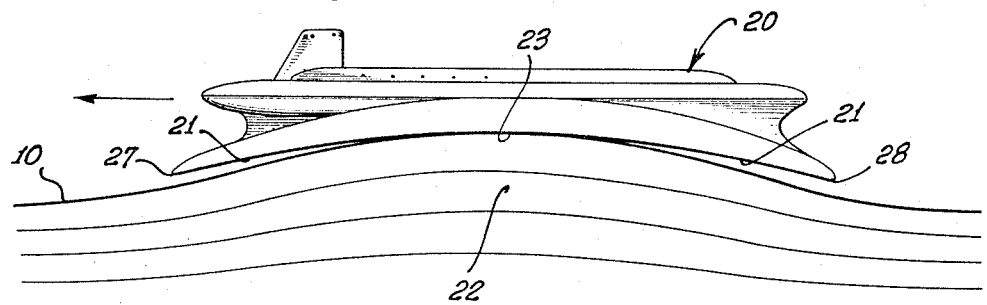
FIGURE 1 is a side view of a surfing craft in accordance with the preferred embodiment of the invention, showing the craft as it translates at high speed upon a standing wave.
Figure 2:
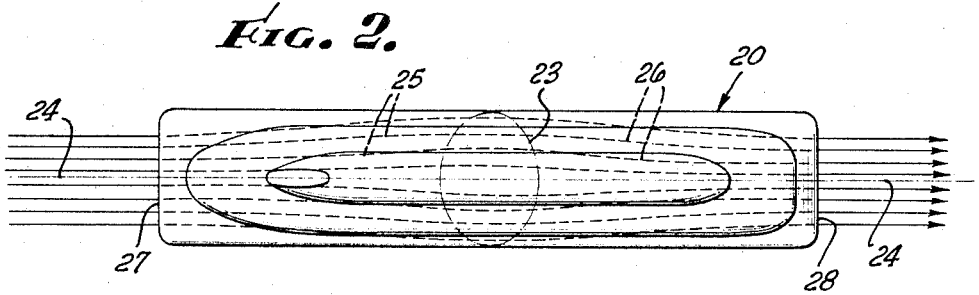
FIGURE 2 is a plan view of the same craft illustrating a surface water streamline pattern continued underneath the bottom of the craft.

Referring now to the FIGURES 1 and 2 in detail, there is illustrated a surfing craft constructed in accordance with the present invention and comprising a main hull 20 having on its underside a pressure generating, cambered bottom 21. The bottom offers no convexity to the water underneath. The craft travels along the interface 10 of the ocean. The bottom geometry of the craft produces a boundary condition on the flow of water 10 by the underside 21 of the craft in such a way that a standing water surface wave 22 is developed. As the craft travels at a speed V in the direction of the arrow in FIGURE 1, the standing wave travels along in the same direction and at the same speed, and the water particles in the wave rotate in a clockwise direction. FIGURE 1 illustrates specifically the case when the craft travels with normal cruising speed. The centrifugal forces in the water particles thus provide sustaining pressure on the underside of the craft. The body 20 with its cambered bottom 21 when operating on the water interface causes the water flow to mount forward and to recede aft of a limited region 23 of direct contact with the craft in a standing wave, standing being understood in relation to the craft 20, such that the surface streamlines of the water flow of the wave 22 form a continuation of the cambered bottom 21 of the body 20 itself along the contact region 23.

Figure 3A:
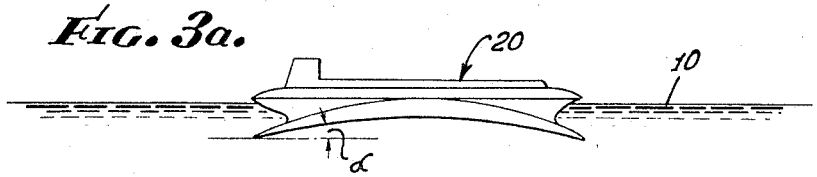
FIGURES 3a, 3b and 3c illustrate schematically the progressive lifting of the craft as it is set into motion.
Figure 3B:
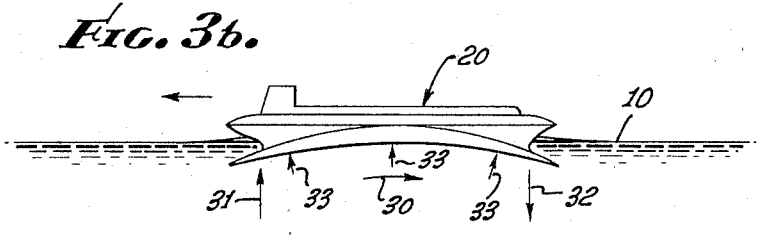
Figure 3C:
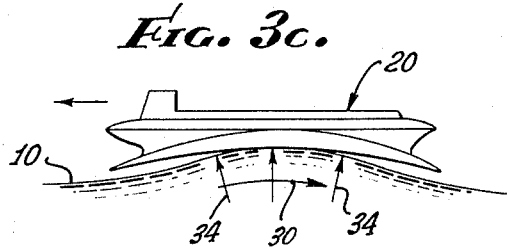

FIGURES 3a, 3b and 3c illustrate the operation of the lifting phenomenon induced as a result of the bottom geometry of the craft. FIGURE 3a shows schematically the craft motionless and floating in the water, partially submerged and kept afloat by buoyancy alone. As the craft is set into motion, water underneath the fore portion of the bottom 21 is forced to flow upward in the direction of arrow 31 as the curved bottom of the craft requires such motion, while in the aft portion water is forced to move in the opposite direction, i.e., down (arrow 32). Thus a resulting movement is induced to flow in direction 30 and, of course, this is a curved motion as it must follow the bottom contour of the craft. As a result of this curved motion centrifugal force is exerted upon the craft in direction of arrows 33. Thus, the craft will tend to lift out of the water. As the motion increases (FIGURE 3c) the standing wave 22 is developed, and the craft is lifted completely out of the water to ride on the crest of the wave, supported by the surface water which is urged in direction of arrows 34 due to a strong centrifugal force, which is the result of a rapid forward motion of the craft.

Of course, at leading and trailing edges, 27 and 28 respectively, of the craft there is some convexity where the bottom merges into the upper structure of the hull. It is important that the overall flow of water underneath the craft as it commences to move is such that the upwardly directed centrifugal force resulting from the flow along the concave bottom prevails over any downwardly directed centrifugal force resulting from flow around any convexities, so that the overall result is a strong lifting force causing the craft to be lifted out of the water to ride on the crest of a self induced wave. The angle α of attack should be positive.

The mound of water of the standing wave rises symmetrically with respect to the longitudinal center line 24, and flows upwards and sideways on the surface under the front portion of the bottom as illustrated by the surface streamlines 25 (FIGURE 2), until pressure from the cambered contact region 23 on the bottom redirects the water downward. Additional means are required to direct the flow also inwardly with respect to its undisturbed level. The standing wave 22 generated by the cambered bottom 21 is longitudinally symmetrical and produces pressures on the bottom which are balanced fore and aft as shown in FIGURE 3c. This result is of extreme practical importance and is one of the major achievements of this invention as it results in no net after component of the centrifugal force produced thereby minimizing power requirements. FIGURE 4 illustrates, that the bottom surface of the craft is also slightly concave laterally to aid in the containment of the water wave underneath. This lateral contour preferably matches the cross sectional profile of the standing wave as produced during cruising speed.

Preferably though not necessarily, the propulsion system of the craft is coupled with the means mentioned above to redirect the surface flow in inward direction at the contact region 23. This is illustrated in one example, and in greater detail in FIGURES 5 and 6.

A water scoop 40 is positioned at the underside of the craft preferably but not necessarily in the contact region, dipping into the water and scooping water into ducts 41. The ducts 41 communicate with pumps 42 inside of hull 20, and they are driven by motors 43 for accelerating the water in the ducts. This water is then discharged at high speed through outlets 44 pertaining to nozzles 46. These nozzles extend all across the underside of the craft, and they produce jets that accelerate the surface and subsurface water somewhat near the aft end of the contact region 23. As illustrated in FIGURE 6, there are vanes 45 which direct the jets near the sides of the craft towards the center line 24. Thus, these jets provide thrust for the craft as well as an inboard component for containment of the standing wave so that the surface streamlines 26 in the aft region have indeed the configuration as illustrated in FIGURE 2.

FIGURES 7 and 8 illustrate somewhat schematically a different propulsion and flow direction system that can be used with advantage. A moving surface is provided which reverses the role of surface friction in providing thrust rather than drag. Here the thrust producing surface is positioned directly in the contact region 23. The thrust producing surface pertains to a deformable cylinder 50 made of hard rubber or the like. The cylinder axis of the drum extends horizontally and transversely to the direction of movement of the craft. The drum rotates in a housing 52 within the hull 20, which housing is sealed against the remaining interior of the hull. Housing 52 has an opening 53 which faces downwardly and thus permits the water to engage the surface of the drum 50. The centrifugal pressure of the mound of the wave deforms the cylinder (see region 51) to an extent that reverses the curvature of the drum in the region with the top of the wave. The drum 50 is driven by suitable driving means 54, such as a combustion engine, steam engine or the like. The drum rotates in a direction which causes the surface of the drum to move in the contact region in opposite direction to the desired movement of the craft. The frictional engagement of the surface of the drum and of the water surface causes the water to be moved in a direction that causes in turn such a water rotation as shown in FIGURES 3b and 3c.

The inboard component of the water results from ridges 55 on the drum having a particular pitch angle at the drum ends directing the ridges and the resulting grooves in between towards the center of the circumference of the drum, but these grooves are not true helices because the pitch angle of each ridge decreases toward center of the mantle of the drum with a pitch angle zero thereat. This coincides with the longitudinal plane of symmetry of the bottom of the craft as running through center of the line 24 drawn in FIGURE 2.

The grooves are oriented to impart an inboard flow component upon the surface water so that the streamlines 26 will result with or without rotating motion of the drum so that the FIGURE 8 can be construed also as illustrating a stationary ridge pattern producing the inboard component; in other words, it is not necessary to drive the drum for producing the inboard, wave containing flow component.

The invention is not limited to the embodiments described above but all changes and modifications thereof not constituting departures from the spirit and scope of the invention are intended to be covered by the following claims.

I claim:
1. A water craft comprising:
a hull having a bottom element which is longitudinally concave down substantially over its entire length, and which has a sharp leading edge from which its lower surface extends aft with a concave curvature and from which its upper surface extends aft to at least some extent with a convex curvature substantially parallel to the lower surface, so that substantially the entire water flow along said bottom element has an upwardly oriented convex interface configuration, and thrust producing means for propelling said craft in longitudinal direction, thereby causing water to flow underneath said hull producing upwardly directed centrifugal force for sustaining said craft.

2. A hull for a water craft having a bottom concave down over substantially the entire length of the hull and terminating in a sharp leading edge and a trailing edge, said leading edge forming the juncture of both lower and upper surfaces extending aft thereof with positive angles of attack, forcing the water to flow about said leading edge producing upwardly directed centrifugal force for sustaining said craft in translational motion.

3. A water craft having a hull, the bottom of which extends concave down substantially over its entire length thus having a sharp leading edge and a downwardly directed, positive angle of attack, said bottom being also concave down in lateral direction, and vane means effective in the concave bottom area to impart inboard motion upon the water in the area of contact with the bottom of the hull.

4. A water craft having a hull the bottom of which extends concave down substantially over the entire length of said bottom, said bottom being also concave down in lateral direction and having a leading edge forming the juncture of a lower and upper surface both having a positive angle of attack.

5. A water craft having a hull the bottom of which extends concave down from a sharp leading edge to a trailing edge, said leading edge forming the juncture of upper and lower surfaces which are substantially parallel thereat with a positive angle of attack with respect to the horizontal, so that the water flow is forced to conform to said surfaces developing a water wave producing an upward force on the craft.

6. A water craft having a hull, the bottom of the hull having a longitudinally concave down bottom surface portion, the leading edge of said bottom forming the juncture of a lower and upper surface both having a positive angle of attack with respect to the horizontal; and propelling means in said craft for imparting a speed on said craft so that in high speed translation the water contacts the bottom of said craft only in said concave bottom portion.

7. A water craft having a hull, the bottom of which is at least part of its length concave down and which has a leading edge forming the juncture of a lower and upper surface both having a positive angle of attack; and
 jet producing means at the bottom of said hull to produce thrust for propelling the craft by accelerating the water flowing along said concave bottom.

8. A water craft having a hull, the bottom of which is at least part of its length concave down and which has a leading edge forming the juncture of a lower and upper surface both having a positive angle of attack;
 jet producing means at the bottom of said hull oriented to direct water jets in aft direction for propelling the craft by accelerating the water flowing along said concave bottom, said jet producing means directing said jets to have an inboard component for laterally containing a standing wave resulting from the flow of water along said concave bottom.

9. A water craft having a hull, the bottom of which is at least part of its length concave down and which has a leading edge forming the juncture of a lower and upper surface both having a positive angle of attack; and means defining an aperture in said bottom; a drum in said hull extending across the aperture to provide frictional engagement with the water contacting the bottom; and means to rotate the drum.

10. A water craft having a hull, the bottom of which is at least part of its length concave down and which has a leading edge comprising the juncture of a lower and upper surface both having a positive angle of attack, means defining an aperture in said bottom, a drum in said hull extending across the aperture to provide frictional engagement with the water contacting the bottom; means to rotate the drum; and ridges on said drum oriented to produce inboard flow along the rear portion of the bottom surface.

11. A water craft having a hull, the bottom of which is at least part of its length concave down and which has a leading edge comprising the juncture of a lower and upper surface both having a positive angle of attack; and jet producing means at the bottom of said hull to produce thrust for propelling the craft.

References Cited by the Examiner

UNITED STATES PATENTS

| | | | |
|---|---|---|---|
| 793,944 | 7/1905 | Manker | 114—62 |
| 1,081,876 | 12/1913 | Watts | 114—62 X |
| 1,838,335 | 12/1931 | Taylor | 115—16 |
| 2,389,729 | 11/1945 | Howland | 9—310 |
| 2,769,421 | 11/1956 | Grieve | 115—16 X |

MILTON BUCHLER, *Primary Examiner.*

T. M. BLIX, *Assistant Examiner.*